(12) United States Patent
Yamaguchi (10) Patent No.: US 11,283,375 B2
(45) Date of Patent: Mar. 22, 2022

(54) SLAVE UNIT AND SERVO DRIVING SYSTEM

(71) Applicant: FANUC CORPORATION, Yamanashi (JP)

(72) Inventor: Takehiro Yamaguchi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 149 days.

(21) Appl. No.: 16/857,118

(22) Filed: Apr. 23, 2020

(65) Prior Publication Data

US 2020/0382026 A1 Dec. 3, 2020

(30) Foreign Application Priority Data

May 31, 2019 (JP) .............................. JP2019-102381

(51) Int. Cl.
*H02P 5/46* (2006.01)
*G05B 19/414* (2006.01)

(52) U.S. Cl.
CPC .............. *H02P 5/46* (2013.01); *G05B 19/414* (2013.01); *G05B 2219/42186* (2013.01)

(58) Field of Classification Search
CPC . H02P 5/46; H02P 25/02; H02P 25/22; G05B 19/414
USPC ................................... 318/690, 34
See application file for complete search history.

(56) References Cited

U.S. PATENT DOCUMENTS 7,462,999 B2 * 12/2008 Mitchell .............. G01R 31/343
318/400.01

FOREIGN PATENT DOCUMENTS

JP 2016-046833 A 4/2016

* cited by examiner

*Primary Examiner* — David Luo
(74) *Attorney, Agent, or Firm* — Studebaker & Brackett PC

(57) ABSTRACT

To avoid cost increase, delay of response, time, and performance degradation in driving a power source including a plurality of servo motors and/or a servo motor with a plurality of windings. A slave unit drives a power source including a plurality of servo motors and/or a servo motor with a plurality of windings using a plurality of amplifiers on the basis of a command from a high-order controller. The slave unit includes: a storage unit stores servo internal statuses of the respective servo motors and/or the respective windings, judgment data, and resource data; a servo internal status copying judgment unit determines a copying source and a copying destination, and judges whether to copy a servo internal status of the copying source to the copying destination to commonalize therebetween on the basis of the judgment data and the resource data; a servo internal status copying execution unit copies the servo internal status of the copying source to the copying destination; and a servo control unit outputs each of the plurality of servo internal statuses to the respective amplifiers to control driving of the power source.

7 Claims, 9 Drawing Sheets

SLAVE UNIT AND SERVO DRIVING SYSTEM

This application is based on and claims the benefit of priority from Japanese Patent Application No. 2019-102381, filed on 31 May 2019, the content of which is incorporated herein by reference.

BACKGROUND OF THE INVENTION

Field of the Invention

The present invention relates to a slave unit and a servo driving system.

Related Art

In some large machine tools or industrial machines, one axis is driven using a plurality of amplifiers and a plurality of servo motors, or a servo motor with a plurality of windings is driven using a plurality of amplifiers (see patent document 1, for example).

As an example, CiA402 has been provided as one of standards for controlling servo motors. According to the CiA402 standard, whether or not a status is excited and ready to be driven, for example, is indicated by the status of each of a plurality of servo motors or the status of each of a plurality of windings, and such statuses are expressed as a "servo internal status" called a power drive system (PDS) status. The servo internal status can be changed using a control word (6040H) compatible with the CiA402 standard given from a high-order controller to allow provision of an instruction for a servo-on status or a servo-off status, for example, to an amplifier. The servo internal status can be acquired using a status word (6041H).

To drive one axis using a plurality of servo motors in strict synchronization with each other or to drive a servo motor with a plurality of windings, strict synchronization is required between a plurality of amplifiers (strict synchronization for servo control between axes or windings is required).

Synchronization between a plurality of amplifiers is established by two methods employed in a manner depending on the position of a servo control unit.

Figure 8:
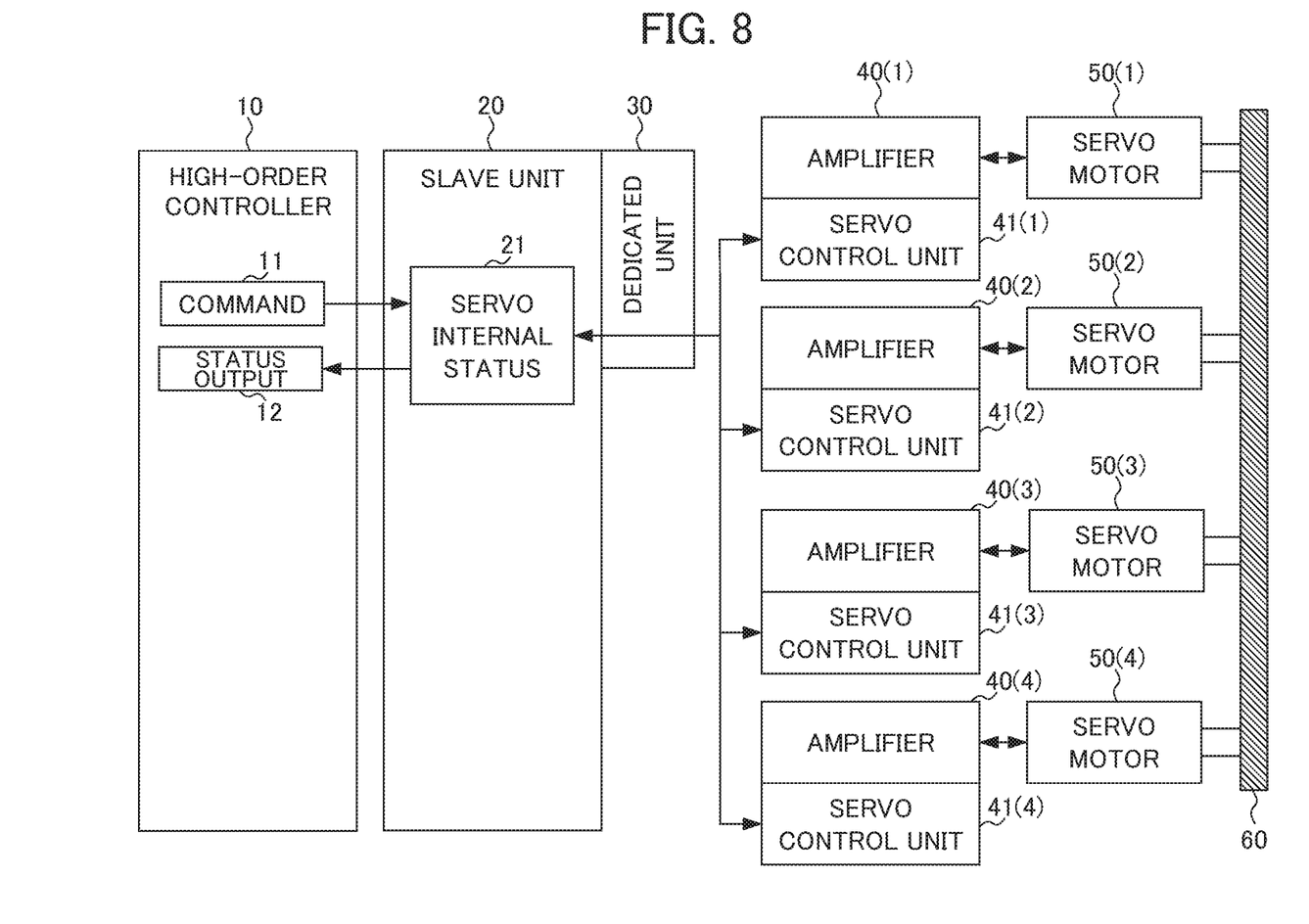
FIG. 8 shows an example of a servo driving system with a servo control unit arranged at each amplifier.

FIG. 8 shows an example of a servo driving system with a servo control unit arranged at each amplifier.

Figure 9:
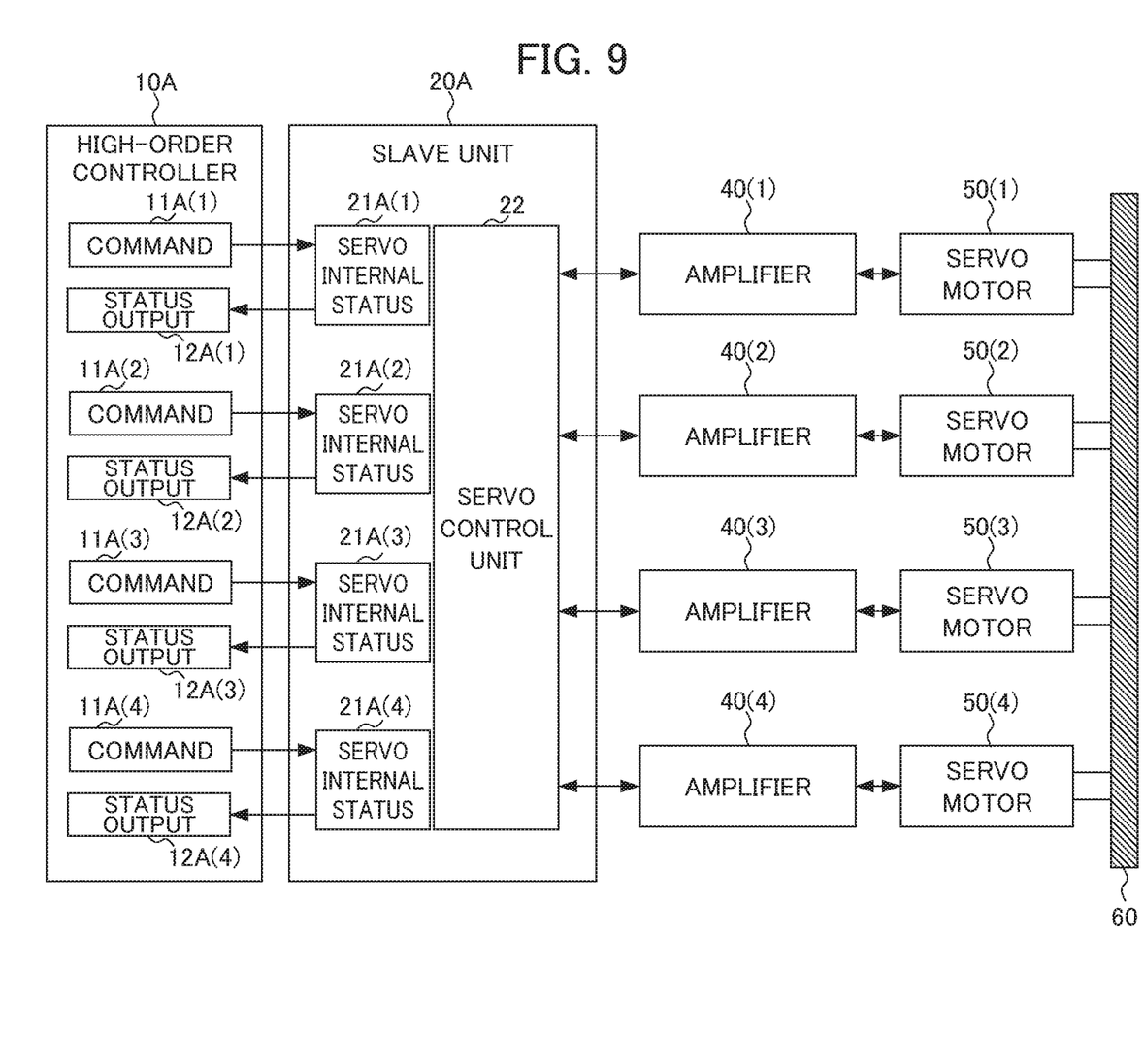
FIG. 9 shows an example of a servo driving system with a servo control unit arranged at a slave unit storing a servo internal status.

FIG. 9 shows an example of a servo driving system with a servo control unit arranged in a slave unit storing a servo internal status. In FIG. 9, a structure having the same function as a corresponding structure in the block diagram of FIG. 8 is identified by the same sign as the corresponding structure.

While the servo driving systems shown in FIGS. 8 and 9 are configured to drive a plurality of servo motors, these configurations are also applicable to a case of driving a servo motor with a plurality of windings.

The servo driving system shown in FIG. 8 includes a high-order controller 10, a CiA402-compatible slave unit 20, a dedicated unit 30, four amplifiers 40(1) to 40(4), four servo control units 41(1) to 41(4), four servo motors 50(1) to 50(4), and a driving mechanism 60 for driving one axis using the four servo motors 50. As shown in FIG. 8, the servo control units 41(1) to 41(4) are arranged at the amplifiers 40(1) to 40(4) respectively. The high-order controller 10 outputs a command 11 to the slave unit 20 using a control word (6040H) to change a servo internal status 21 stored in a storage unit not shown such as a random access memory (RAM) or a hard disk drive (HDD) included in the slave unit 20. Then, to give commands to the amplifiers 40(1) to 40(4) simultaneously, the dedicated unit 30, which is a motion controller, for example, outputs the updated servo internal status 21 to the servo control units 41(1) to 41(4) simultaneously.

The dedicated unit 30 acquires information indicating the respective statuses of the servo motors 50(1) to 50(4) through the amplifiers 40(1) to 40(4) and the servo control units 41(1) to 41(4) respectively, and outputs the acquired information to the servo internal status 21 in the slave unit 20. Then, the high-order controller 10 acquires the servo internal status 21 as a status output 12 using a status word (6041H).

In this way, the servo driving system of FIG. 8 attains strict synchronization between the amplifiers 40(1) to 40(4), making it possible to drive one axis using the servo motors 50(1) to 50(4) in strict synchronization with each other.

The servo driving system shown in FIG. 9 includes a high-order controller 10A, a CiA402-compatible slave unit 20A, the amplifiers 40(1) to 40(4), the servo motors 50(1) to 50(4), and the driving mechanism 60. As shown in FIG. 9, a servo control unit 22 is arranged in the slave unit 20A. The high-order controller 10A outputs commands 11A(1) to 11A(4) for the amplifiers 40(1) to 40(4) respectively to the slave unit 20A using a control word (6040H). At the same time, the high-order controller 10A acquires servo internal statuses 21A(1) to 21A(4) in the slave unit 20A as status outputs 12A(1) to 12A(4) respectively using a status word (6041H). Then, the servo control unit 22 in the slave unit 20A outputs the updated servo internal statuses 21A(1) to 21A(4) simultaneously to the amplifiers 40(1) to 40(4) respectively.

In this way, the servo driving system of FIG. 9 attains strict synchronization between the amplifiers 40(1) to 40(4), making it possible to drive one axis using the servo motors 50(1) to 50(4) in strict synchronization with each other.

Patent Document 1: Japanese Unexamined Patent Application, Publication No. 2016-46833

SUMMARY OF THE INVENTION

The servo driving system of FIG. 8 requires the dedicated unit 30, so that cost increase may be caused.

The servo driving system of FIG. 9 requires communication of communication packets (communication data) including the servo internal statuses 21A(1) to 21A(4). This may increase communication load and further increase resource consumption. In the servo driving system of FIG. 9, the high-order controller 10A is required to attain strict simultaneity between output of the commands 11A(1) to 11A(4) and acquisition of the status outputs 12A(1) to 12A(4). Additionally, in the servo driving system of FIG. 9, the high-order controller 10A is required to prepare the commands 11A(1) to 11A(4) necessary for the servo internal statuses 21A(1) to 21A(4) to be output to the amplifiers 40(1) to 40(4) respectively. Hence, processing load may be increased. This may cause influence such as "delay of response time" or "insufficient performance" in the servo driving system of FIG. 9.

Hence, avoiding cost increase, delay of response time, and performance degradation has been desired in driving a power source including a plurality of servo motors and/or a servo motor with a plurality of windings.

(1) One aspect of a slave unit of this disclosure is a slave unit that drives a power source including a plurality of servo motors and/or a servo motor with a plurality of windings using a plurality of amplifiers on the basis of a command from a high-order controller. The slave unit includes: a storage unit stores servo internal statuses indicating the respective statuses of the plurality of servo motors and/or the respective statues of the plurality of windings, judgment data indicating the content of a set parameter, and resource data indicating at least the configuration of the plurality of amplifiers and the power source; a servo internal status copying judgment unit, on the basis of the judgment data and the resource data, the servo internal status copying judgment unit determines one servo internal status of the plurality of servo internal statuses to be a copying source, determines at least one remaining servo internal status to be a copying destination, and judges whether to copy the servo internal status of the copying source to the copying destination to commonalize between the copying source and the copying destination; a servo internal status copying execution unit copies the servo internal status of the copying source to the copying destination on the basis of a result of the judgment by the servo internal status copying judgment unit; and a servo control unit outputs each of the plurality of servo internal statuses to each of the plurality of amplifiers to control driving of the power source.

(2) One aspect of a servo driving system of this disclosure includes a high-order controller and the slave unit described in (1).

According to the one aspect, cost increase, delay of response time, and performance degradation can be avoided in driving a power source including a plurality of servo motors and/or a servo motor with a plurality of windings.

DETAILED DESCRIPTION OF THE INVENTION

An embodiment will be described below using the drawings.

Embodiment

Figure 1:
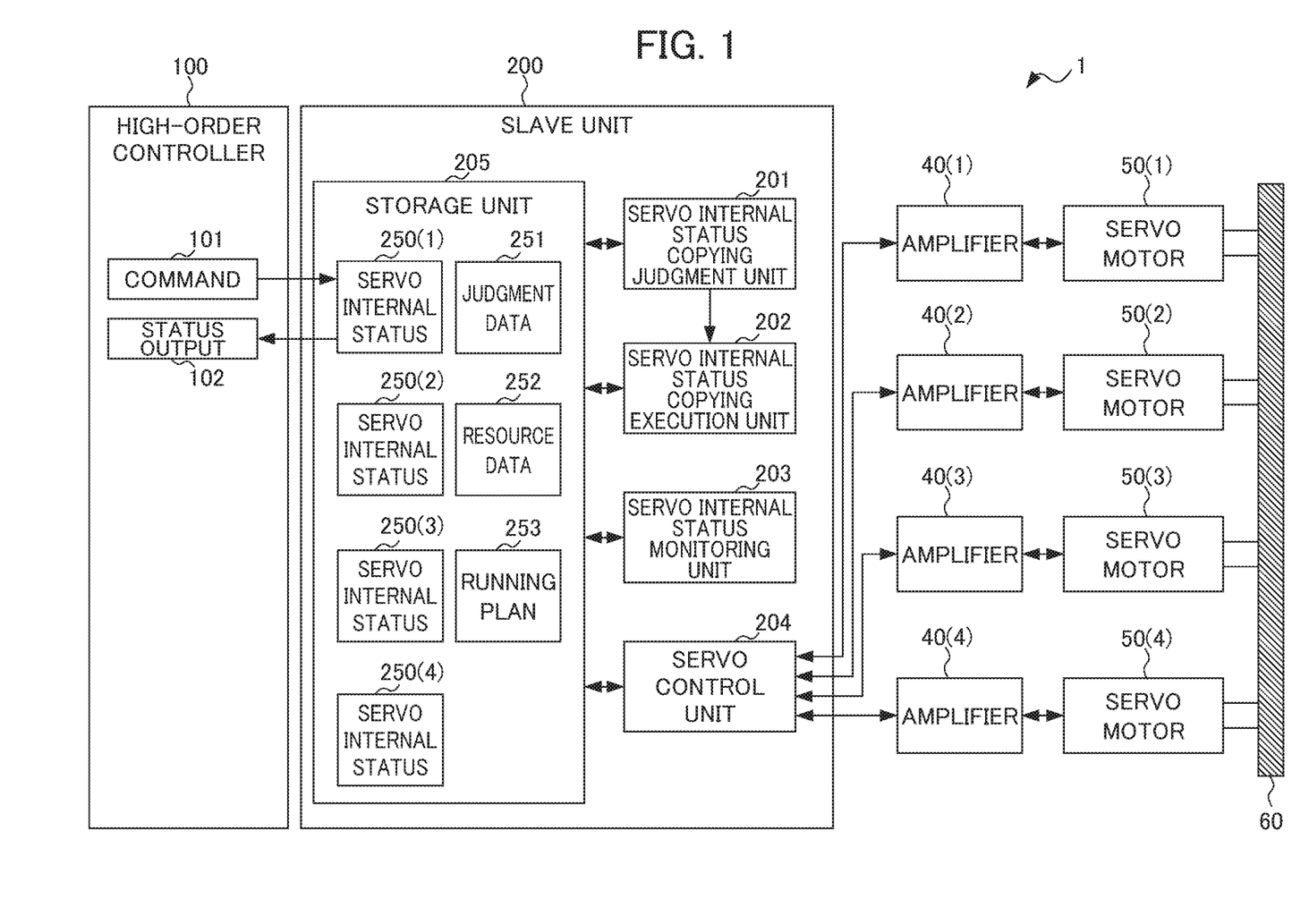
FIG. 1 is a functional block diagram showing an example of a functional configuration of a servo driving system according to an embodiment.

FIG. 1 is a functional block diagram showing an example of a functional configuration of a servo driving system 1 according to the embodiment. A structure having the same function as a corresponding structure is the block diagram of FIG. 8 is identified by the same sign as the corresponding structure and will not be described in detail.

As shown in FIG. 1, the servo driving system 1 includes a high-order controller 100, a slave unit 200, amplifiers 40(1) to 40(4), and servo motors 50(1) to 50(4).

The following description of the operation of the servo driving system 1 is given on condition that the servo driving system 1 includes the four amplifiers 40(1) to 40(4) and the four servo motors 50(1) to 50(4). The servo driving system 1 operates in the same way if the number of a plurality of amplifiers 40 is other than four, and the number of a plurality of servo motors 50 is other than four.

The high-order controller 100 and the slave unit 200 may directly be connected to each other through a connection interface not shown. The high-order controller 100 and the slave unit 200 may be connected to each other through a network such as a local area network (LAN). In this case, the high-order controller 100 and the slave unit 200 may be provided with respective communication units not shown for making communication with each other using such connection.

The high-order controller 100 outputs a command 101 using a control word (6040H) for changing a servo internal status 250(1) described later to the slave unit 200 through the connection interface not shown. At the same time, the high-order controller 100 acquires the servo internal status 250(1) as a status output 102 using a status word (6041H) through the connection interface not shown.

<Slave Unit 200>

As shown in FIG. 1, the slave unit 200 according to the embodiment is a CiA402-compatible slave unit, and the configuration of the slave unit 200 includes a servo internal status copying judgment unit 201, a servo internal status copying execution unit 202, a servo internal status monitoring unit 203, a servo control unit 204, and a storage unit 205.

To realize the motions of the functional blocks of FIG. 1, the slave unit 200 includes an operational processor such as a central processing unit (CPU) not shown. The slave unit 200 includes an auxiliary storage device not shown such as a read only memory (ROM) or a HDD storing various types of control programs, and a main storage device not shown such as a RAM for storing data temporarily required for execution of a program by the operational processor.

In the slave unit 200, while the operational processor reads an OS and application software from the auxiliary storage device and expands the read OS and application software in the main storage device, the operational processor performs operational processing on the basis of these OS and application software. The slave unit 200 controls each hardware on the basis of a result of the operational processing. In this way, processes by the functional blocks of FIG. 1 are realized. Namely, the slave unit 200 can be realized by causing hardware and software to work cooperatively.

The servo internal status copying judgment unit 201 judges on the basis of judgment data 251 and resource data 252 described later whether to execute copying. If copying is judged to be executed, the servo internal status copying judgment unit 201 determines the servo internal status 250(1) of servo internal statuses 250 to be a copying source, for example. The servo internal status copying judgment unit 201 determines the remaining servo internal statuses 250(2) to 250(4) to be copying destinations, and judges whether to copy the servo internal status 250(1) of the copying source to each of the servo internal statuses 250(2) to 250(4) of the copying destinations to attain commonality among the servo internal statuses 250(1) to 250(4). The servo internal status copying judgment unit 201 outputs a result of the judgment to the servo internal status copying execution unit 202.

In the foregoing description, the servo internal status copying judgment unit 201 determines the servo internal status 250(1) to be a copying source. However, this is not the only configuration but the servo internal status copying judgment unit 201 may determine any one of the servo internal statuses 250(2) to 250(4) to be a copying source.

On the basis of the result of the judgment by the servo internal status copying judgment unit 201, the servo internal status copying execution unit 202 copies the servo internal status 250(1) of the copying source to each of the servo internal statuses 250(2) to 250(4) of the copying destinations in the storage unit 205. Namely, the servo internal status copying execution unit 202 attains commonality among the servo internal statuses 250(1) to 250(4).

By doing so, in the servo driving system 1 according to the embodiment, the servo internal statuses 250(1) to 250(4) can be updated easily, and the updated servo internal statuses 250(1) to 250(4) can be output simultaneously to the amplifies 40(1) to 40(4) respectively only by outputting one command 101 to the slave unit 200, and at the same time, by receiving one status output 102.

The servo internal status monitoring unit 203 monitors the servo internal statuses 250(2) to 250(4) of the copying destinations, for example.

More specifically, the servo internal status monitoring unit 203 compiles each of the servo internal statuses 250(2) to 250(4) of the copying destinations corresponding to a target axis into the servo internal status 250(1) of the copying source by taking a logical sum of each of the servo internal statuses 250(2) to 250(4) and the servo internal status 250(1), for example. If a servo excited status is removed in any of the servo motors 50 or if any of the amplifiers 40 is placed in an alarming status due to abnormality, for example, the servo internal status monitoring unit 203 notifies the high-order controller 100 of the status output 102 that is the compiled servo internal status 250(1) of the copying source. This allows the high-order controller 100 to detect the abnormality occurring at any of the amplifiers 40 or any of the servo motors 50.

The servo internal status monitoring unit 203 may update the judgment data 251 and the resource data 252 described later on the basis of a result of the monitoring.

The servo control unit 204 outputs the servo internal statuses 250(1) to 250(4) to the amplifiers 40(1) to 40(4) respectively to control driving of a power source including the servo motors 50(1) to 50(4).

The storage unit 205 is a solid state drive (SSD) or a HDD, for example, and stores the servo internal statuses 250(1) to 250(4), the judgment data 251, the resource data 252, and a running status 253.

As described above, the servo internal statuses 250(1) to 250(4) contains data compatible with the CiA402 standard and indicating the status of each of the servo motors 50(1) to 50(4) such as whether each of the servo motors 50(1) to 50(4) is in a status of being excited and ready to be driven. In FIG. 1, the servo internal status 250(1) is a copying source and updated on the basis of the command 101 from the high-order controller 100. The servo internal statuses 250(2) to 250(4) are copying destinations to which the servo internal status 250(1) of the copying source is copied by the servo internal status copying execution unit 202, thereby attaining commonality among the servo internal statuses 250(1) to 250(4).

The servo internal statuses 250(1) to 250(4) may be updated on the basis of information indicating the statuses of the servo motors 50(1) to 50(4) acquired by the servo control unit 204 through the amplifiers 40(1) to 40(4) respectively.

The judgment data 251 contains data such as contents of setting about parameters set at the amplifiers 40(1) to 40(4) and the servo motors 50(1) to 50(4), for example. The judgment data 251 may be updated on the basis of a result of the monitoring by the servo internal status monitoring unit 203.

The resource data 252 contains data such as the number of servo internal statuses available for copying, or data about the configuration of the amplifiers 40(1) to 40(4) and that of the servo motors 50(1) to 50(4), for example. The resource data 252 may contain data about a source and a destination of copying of the servo internal status 250. The resource data 252 may be updated on the basis of a result of the monitoring by the servo internal status monitoring unit 203.

The running status 253 contains data about a running status of a machine such as a machine tool or a robot (not shown) as a driving target to be driven to operate by the servo motors 50(1) to 50(4). Namely, the running status 253 contains the content of operation of the machine (not shown) to be operated on the basis of the command 101 from the high-order controller 100.

<Copying Process in Slave Unit 200>

The operation of the slave unit 200 relating to copying process according to the embodiment will be described next.

Figure 2:
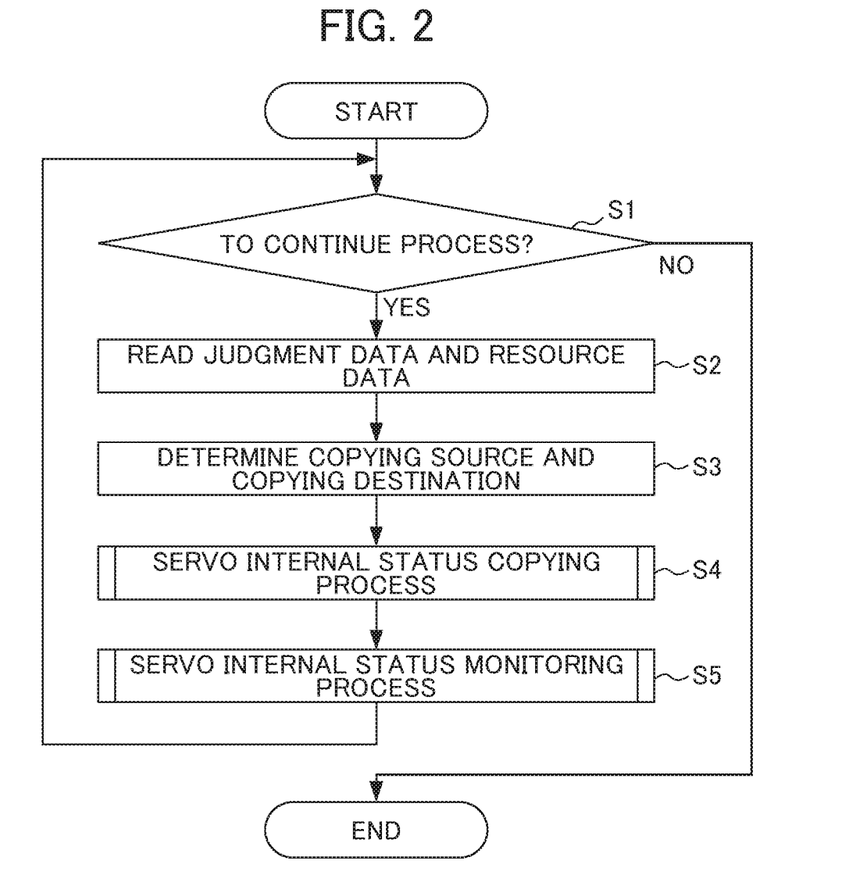
FIG. 2 is a flowchart explaining copying process in a slave unit of FIG. 1.
Figure 3:
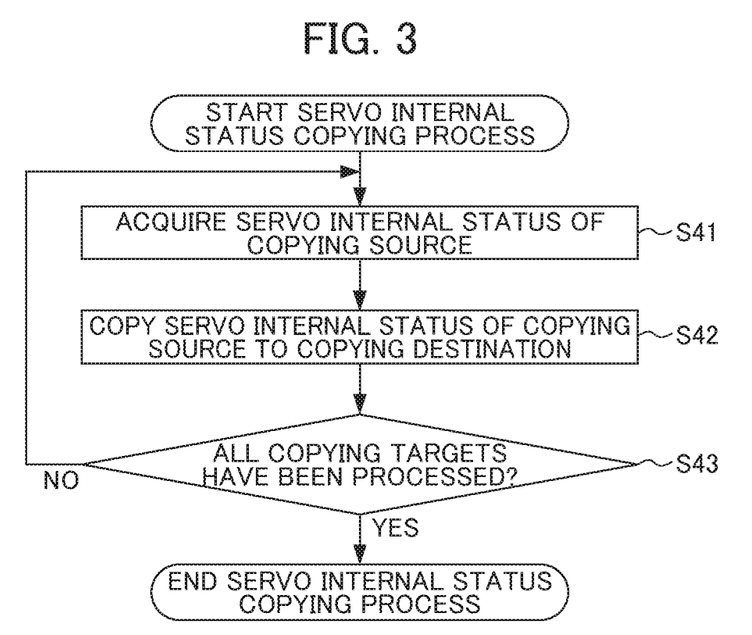
FIG. 3 is a flowchart explaining servo internal status copying process shown in FIG. 2.
Figure 4:
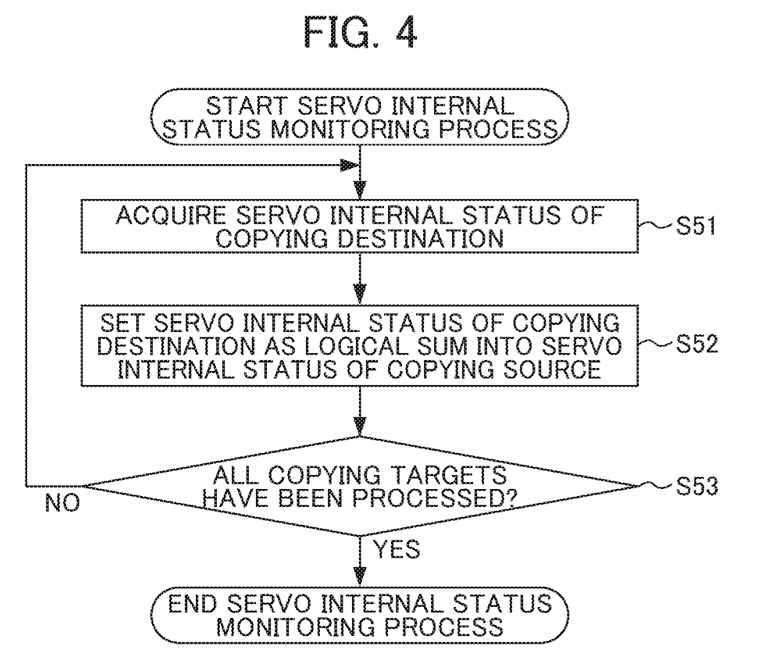
FIG. 4 is a flowchart explaining servo internal status monitoring process shown in FIG. 2.

FIGS. 2 to 4 are flowcharts explaining the copying process in the slave unit 200 of FIG. 1.

In step S1, the servo internal status copying judgment unit 201 judges whether to continue the copying process. If the copying process is to be continued, the procedure proceeds to step S2. If the copying process is not to be continued, the procedure is ended.

In step S2, the servo internal status copying judgment unit 201 reads the judgment data 251 and the resource data 252 from the storage unit 205.

In step S3, on the basis of the judgment data 251 and the resource data 252 read in step S2, the servo internal status copying judgment unit 201 determines the servo internal status 250(1) to be a copying source and determines the servo internal statuses 250(2) to 250(4) to be copying destinations.

In step S4, the servo internal status copying execution unit 202 performs servo internal status copying process of copying the servo internal status 250(1) determined to be the copying source in step S3 to each of the servo internal statuses 250(2) to 250(4) of the copying destinations. A flow of the servo internal status copying process will be described in detail later.

In step S5, the servo internal status monitoring unit 203 performs servo internal status monitoring process of monitoring the servo internal statuses 250(2) to 250(4) of the copying destinations. Then, the procedure returns to step S1. A flow of the servo internal status monitoring process will be described in detail later.

FIG. 3 is a flowchart explaining the details of the servo internal status copying process shown in step S4 of FIG. 2.

In step S41, the servo internal status copying execution unit 202 acquires the servo internal status 250(1) of the copying source from the storage unit 205.

In step S42, the servo internal status copying execution unit 202 copies the servo internal status 250(1) of the copying source acquired in step S41 to the copying destinations determined in step S3.

In step S43, the servo internal status copying execution unit 202 judges whether the servo internal status 250(1) of the copying source has been copied to all the copying destinations as copying targets. If the servo internal status 250(1) has been copied to all the copying targets, the servo internal status copying process is ended and the procedure proceeds to step S5. If the servo internal status 250(1) has not been copied to all the copying targets, the procedure returns to step S41.

FIG. 4 is a flowchart explaining the details of the servo internal status monitoring process shown in step S5 of FIG. 2.

In step S51, the servo internal status monitoring unit 203 acquires the servo internal status 250(2) of the copying destination, for example, from the storage unit 205 to which the servo internal status 250(1) has been copied in step S42.

In step S52, the servo internal status monitoring unit 203 sets (compiles) the servo internal status 250(2) of the copying destination acquired in step S51 as a logical sum into the servo internal status 250(1) of the copying source.

In step S53, the servo internal status monitoring unit 203 judges whether the servo internal statuses 250 as all the copying destinations as all copying targets have been set. If the servo internal statuses 250 as all the copying targets have been set, the servo internal status monitoring process is ended and the procedure returns to step S1. If the servo internal statuses 250 as all the copying targets have not been set, the procedure returns to step S51.

As described above, the slave unit 200 according to the embodiment determines one servo internal status 250(1) to be a copying source, determines the remaining servo internal statuses 250(2) to 250(4) to be copying destinations, and copies the servo internal status 250(1) of the copying source to each of the copying destinations. Thus, in the servo driving system 1, through communication of the command 101 and the status output 102 as a pair, it becomes possible to drive one axis using the servo motors 50(1) to 50(4) in synchronization with each other to achieve suppression of increase in communication load, increase in resource consumption, and increase in processing load. Namely, the servo driving system 1 can avoid delay of response time and performance degradation.

Unlike in the servo driving system of FIG. 8, the slave unit 200 can output the servo internal statuses 250(1) to 250(4) simultaneously to the amplifies 40(1) to 40(4) respectively without the need of using the dedicated unit 30, thereby achieving cost reduction.

The slave unit 200 monitors the servo internal statuses 250(2) to 250(4) of the copying destinations, compiles each of the servo internal statuses 250(2) to 250(4) of the copying destinations into the servo internal status 250(1) of the copying source by taking a logical sum of each of the servo internal statuses 250(2) to 250(4) and the servo internal status 250(1), and notifies the compiled servo internal status 250(1) to the high-order controller 100. This allows the high-order controller 100 to detect abnormality occurring at any of the amplifiers 40 or any of the servo motors 50.

While the embodiment has been described above, the servo driving system 1 is not limited to the foregoing embodiment but it includes modifications, improvements, etc. within a range in which the purpose is attainable.

<First Modification>

In the foregoing embodiment, the servo driving system 1 drives one axis using a plurality of servo motors 50 in synchronization with each other. Alternatively, a driving target may be a servo motor with a plurality of windings.

Figure 5:
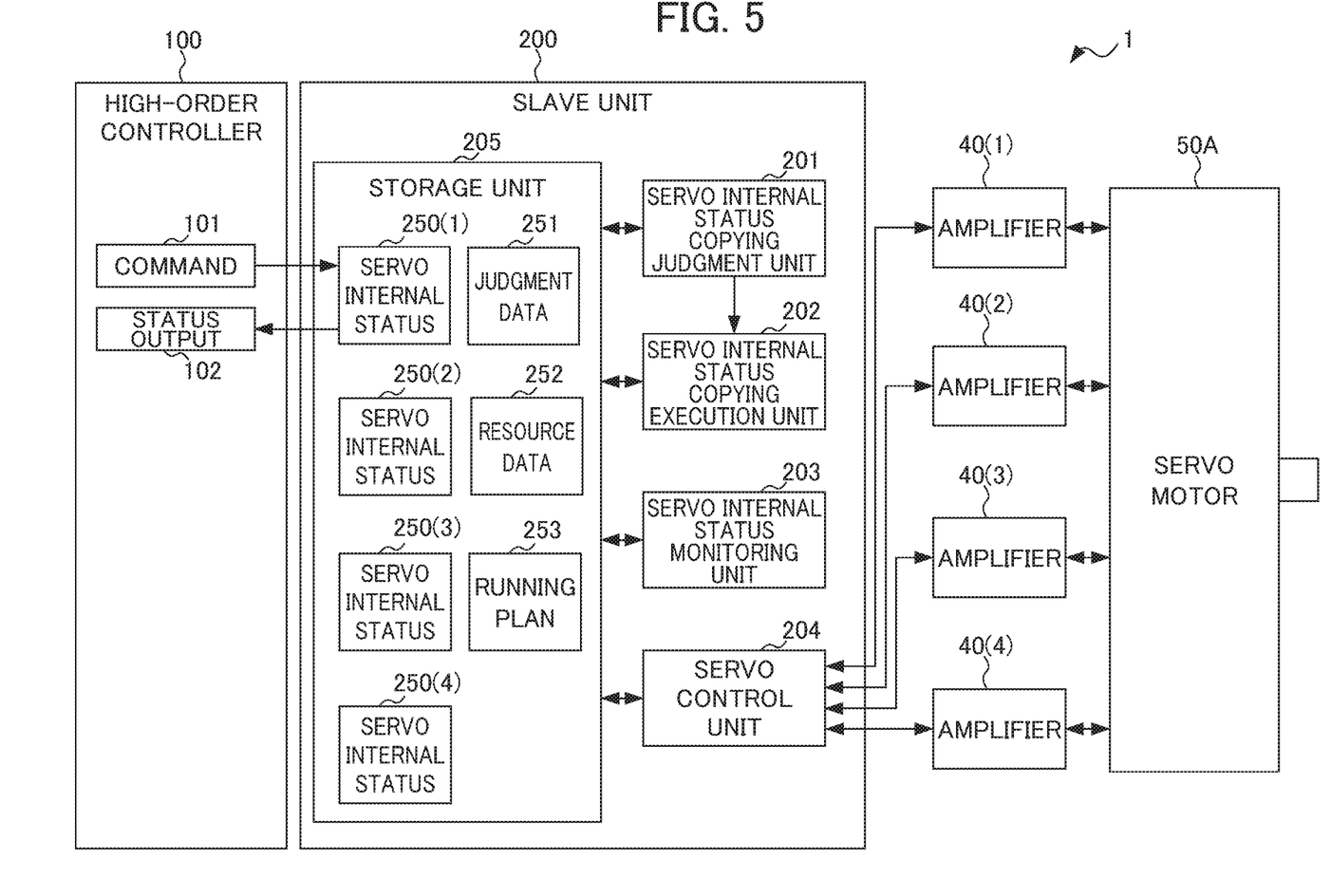
FIG. 5 shows an example of a servo driving system for driving a power source that is a servo motor with a plurality of windings.

FIG. 5 shows an example of a servo driving system for driving a power source that is a servo motor 50A with a plurality of windings. The amplifiers 40(1) to 40(4) are connected to respective four windings not shown of the servo motor 50A. The servo internal statuses 250(1) to 250(4) contain data indicating the statues of the respective four windings not shown.

While the servo motor 50A of FIG. 5 is described as having the four windings, the servo motor 50A may have a plurality of windings of a number other than four. In this case, the number of the amplifiers 40 and that of the servo internal statuses 250 change according to the number of the windings.

<Second Modification>

As another example, in the servo driving system 1 described in the foregoing embodiment, the servo internal status 250 as one copying source is copied to the servo internal statuses 250 as all the remaining copying destinations. However, this is not the only configuration.

For example, the servo internal status copying judgment unit 201 may change a copying destination as a copying target dynamically according to change in a machine configuration. If the servo internal status copying judgment unit 201 detects the occurrence of abnormality at the amplifier 40 or the servo motor 50 corresponding to the servo internal status 250 or a copying destination on the basis of the judgment data 251 or the resource data 252, for example, the servo internal status copying judgment unit 201 may eliminate the servo internal status 250 of the copying destination corresponding to the occurrence of the abnormality from a copying target.

The servo internal status copying judgment unit 201 may use "energy saving preferred" or "accuracy preferred", for example, as the judgment data 251 according to the content of operation in a machine not shown indicated by the running status 253. If an instruction for "energy saving preferred" is given from the high-order controller 100, for example, the servo internal status copying judgment unit 201 may determine the servo internal status 250(1) to be a copying source and determine only the servo internal status 250(2) of the three servo internal statuses 250(2) to 250(4) to be a copying destination. By doing so, if machining accuracy required for the content of operation in the machine not shown is not so high, one axis is driven using some of the servo motors 50 to achieve energy saving.

If an instruction for "accuracy preferred" is given from the high-order controller 100, the servo internal status copying judgment unit 201 may determine the servo internal status 250(1) to be a copying source and determine all the remaining servo internal statuses 250(2) to 250(4) to be copying destinations on the basis of the judgment data 251. By doing so, if machining accuracy required for the content of operation in the machine not shown is high, one axis is driven using all the servo motors 50 to achieve the required machining accuracy.

In other words, the servo internal status copying judgment unit 201 may make a plan (schedule) for a copying destination as a copying target according to the content of operation in the machine not shown indicated by the running status 253. Then, the servo internal status copying judgment unit 201 may judge on the basis of the judgment data 251 and the resource data 252 whether to copy the servo internal status 250 of a copying source to the planned copying destination to attain commonality between these servo internal statuses 250.

<Third Modification>

As another example, while the servo internal status copying execution unit 202 copies the servo internal status 250 of a copying source to a copying destination in the foregoing embodiment, the servo internal status copying execution unit 202 may copy an operation mode of a copying source (control system for position/speed/torque, etc.) to a copying destination. Alternatively, the servo internal status copying execution unit 202 may copy a motion command to a copying source (position command/speed command/torque command, etc.) to a copying destination.

<Fourth Modification>

As another example, while the servo driving system 1 drives one axis using a power source that is the four servo motors 50(1) to 50(4) in synchronization with each other in the foregoing embodiment, the servo driving system 1 may alternatively drive one axis using a power source that is a combination of a plurality of servo motors 50 each having a single winding and a servo motor having a plurality of windings.

Figure 6:
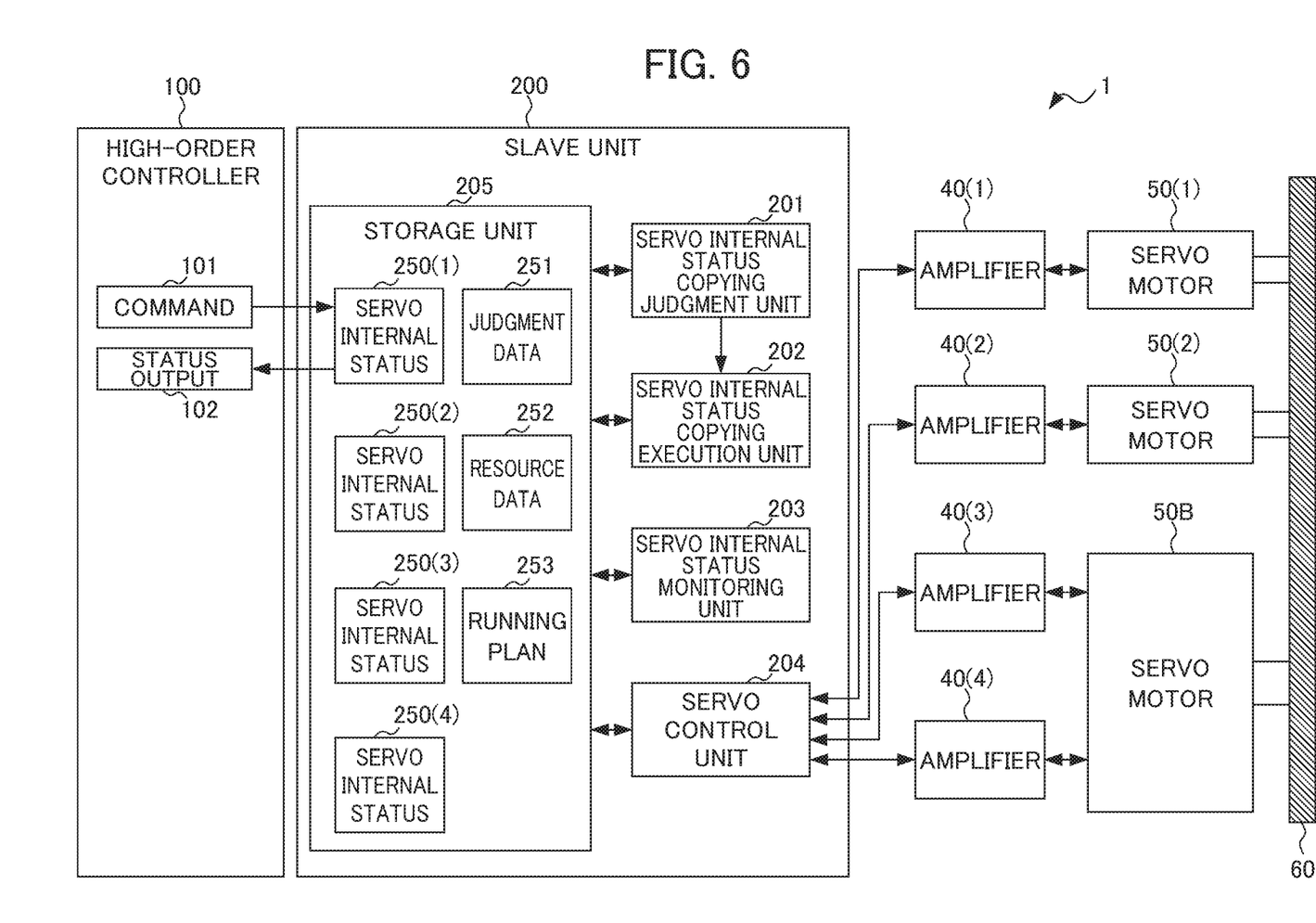
FIG. 6 shows an example of a servo driving system.

FIG. 6 shows an example of the servo driving system 1. In the configuration shown in FIG. 6, one axis is driven using two servo motors 50(1) and 50(2) and a servo motor 50B with two windings in synchronization with each other, and amplifiers 40(3) and 40(4) are connected to the respective two windings of the servo motor 50B.

<Fifth Modification>

As another example, while the servo driving system 1 drives one axis using the four servo motors 50(1) to 50(4) in synchronization with each other in the foregoing embodiment, the servo driving system 1 may alternatively drive a plurality of axes.

Figure 7:
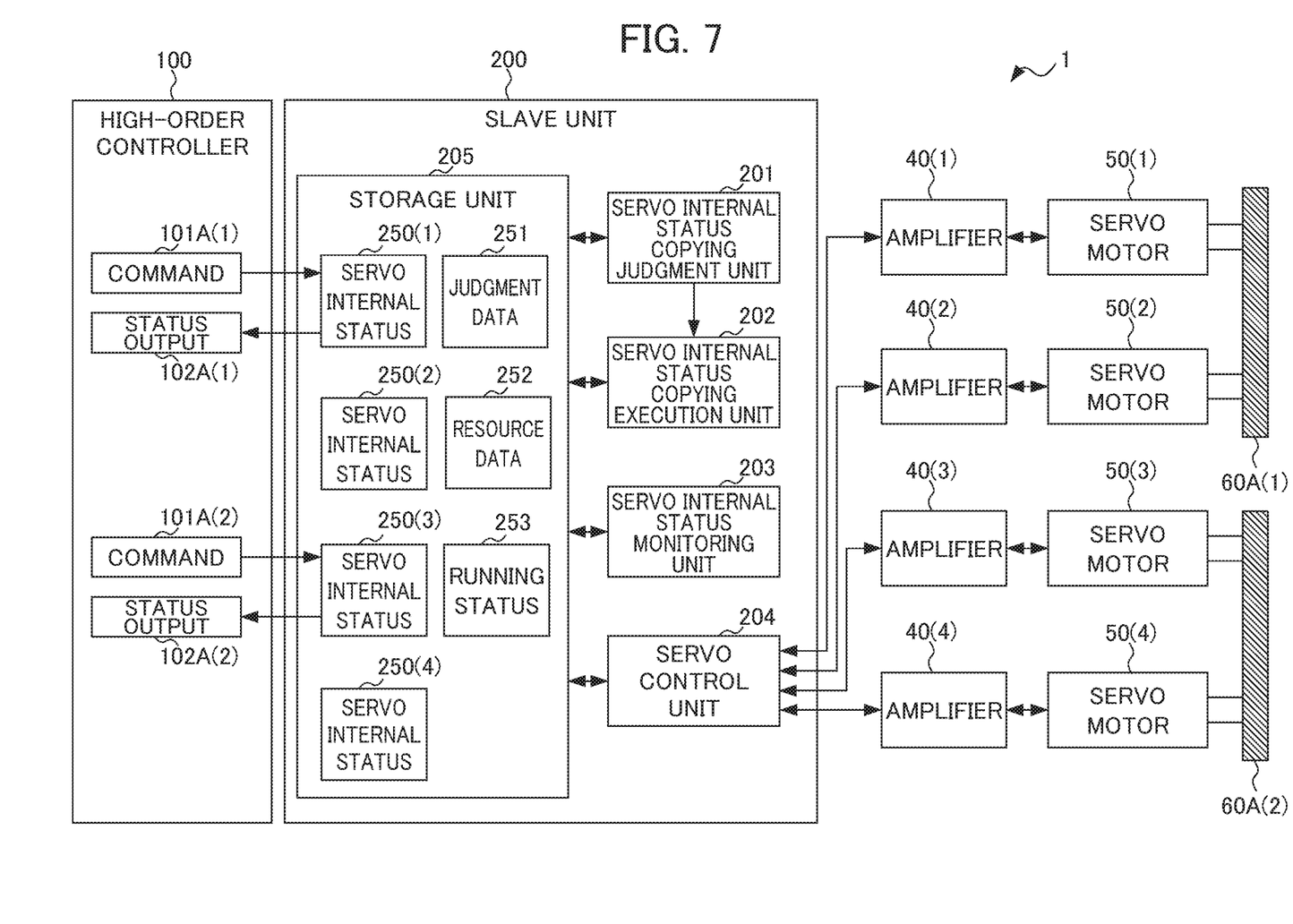
FIG. 7 shows an example of a servo driving system.

FIG. 7 shows an example of the servo driving system 1. In the configuration shown in FIG. 7, two axes are driven using the four servo motors 50(1) to 50(4) in synchronization with each other. More specifically, the servo motors 50(1) and 50(2) drive one axis in synchronization with each other through a driving mechanism 60A(1), and the servo motors 50(3) and 50(4) drive one axis in synchronization with each other through a driving mechanism 60A(2).

In this configuration, the slave unit 200 defines a group including the servo internal statuses 250(1) and 250(2) as a pair, and a group including the servo internal statuses 250(3) and 250(4) as a pair. Then, simultaneously with receipt of a command 101A(1) and a command 101A(2) for the respective groups from the high-order controller 100, the slave unit 200 may output a status output 102A and a status output 102A(2). Further, on the basis of the judgment data 251 and the resource data 252, the servo internal status copying judgment unit 201 may judge whether to execute copying in each group, and determine a copying source and a copying destination if copying is judged to be executed. Further, the servo internal status monitoring unit 203 may monitor the servo internal statuses 250 in units of groups.

As a specific example, the servo internal status copying judgment unit 201 determines the servo internal statuses 250(1) and 250(3) to be copying sources, and determines the servo internal statuses 250(2) and 250(4) to be copying destinations in the respective groups. Then, the servo internal status copying execution unit 202 copies the servo internal status 250(1) of the copying source to the servo internal status 250(2) of the copying destination, and copies the servo internal status 250(3) of the copying source to the servo internal status 250(4) of the copying destination in the respective groups. Further, the servo internal status monitoring unit 203 compiles the servo internal status 250(2) of the copying destination into the servo internal status 250(1) of the copying source by taking a logical sum of the servo internal status 250(2) and the servo internal status 250(1), and compiles the servo internal status 250(4) of the copying destination into the servo internal status 250(3) of the copying source by taking a logical sum of the servo internal status 250(4) and the servo internal status 250(3) in the respective groups.

In FIG. 7, two axes are driven using the four servo motors 50(1) to 50(4) in synchronization with each other, and the servo internal statuses 250(1) to 250(4) are divided into two groups. However, this is not the only configuration. For example, a plurality of axes of a number equal to or greater than two may be driven using a plurality of servo motors 50 of a number other than four, and the servo internal statuses 250 may be divided into groups of a number responsive to the number of the axes.

The functions of the servo driving system 1 and those of the slave unit 200 according to the embodiment can be realized by hardware, software, or a combination of hardware and software. Being realized by software means being realized by reading and execution of a program by a computer.

Each structure unit in the servo driving system 1 and each structure unit in the slave unit 200 can be realized by hardware including an electronic circuit, etc., software, or a combination of hardware and software. To realize each structure unit by software, programs configuring the software are installed on a computer. These programs may be stored in a removable medium and then distributed to a user. Alternatively, these programs may be distributed by being downloaded to a computer of the user through a network. If hardware is used for the configuration, some or all of the foregoing functions of the structure units in the foregoing device can be configured using an integrated circuit (IC) such as an application specific integrated circuit (ASIC), a gate array, a field programmable gate array (FPGA), or a complex programmable logic device (CPLD), for example.

The programs can be stored using various types of non-transitory computer-readable media and can be supplied to a computer. The non-transitory computer-readable media include various types of tangible storage media. Examples of the non-transitory computer-readable media include a magnetic storage medium (a flexible disk, magnetic tape, or a hard disk drive, for example), a magneto-optical storage medium (a magneto-optical disk, for example), a CD read-only memory (CD-ROM), a CD-R, a CD-R/W, and a semiconductor memory (a mask ROM, a PROM, an EPROM, a flash ROM, or a RAM, for example). The programs can also be supplied to the computer using various types of transitory computer-readable media. Examples of the transitory computer-readable media include electrical signals, optical signals, and electromagnetic waves. The transitory computer-readable media can be used for supplying the programs to the computer via wired communication paths such as an electric wire and an optical fiber, or wireless communication paths.

Steps describing the programs stored in a storage medium certainly include processes to be performed in chronological order according to the order of the steps, and further include processes not to necessarily be performed in chronological order but to be performed in parallel or individually.

As another way of stating the foregoing, the slave unit and the servo driving system of this disclosure can be embodied in a wide variety of ways having the configurations as follows:

(1) The slave unit 200 of this disclosure is a slave unit that drives a power source including the plurality of servo motors 50 and/or the servo motor 50A with a plurality of windings using the plurality of amplifiers 40 on the basis of a command from the high-order controller 100. The slave unit 200 includes: the storage unit 205 stores the servo internal statuses 250 indicating the respective statuses of the plurality of servo motors 50 and/or the respective statues of the plurality of windings, the judgment data 251 indicating the content of a set parameter, and the resource data 252 indicating at least the configuration of the plurality of amplifiers 40 and the power source; the servo internal status copying judgment unit 201, on the basis of the judgment data 251 and the resource data 252, the servo internal status copying judgment unit 201 determines one servo internal status 250(1) of the plurality of servo internal statuses 250 to be a copying source, determines at least one remaining servo internal status 250 to be a copying destination, and judges whether to copy the servo internal status 250(1) of the copying source to the copying destination to commonalize between the copying source and the copying destination; the servo internal status copying execution unit 202 copies the servo internal status 250(1) of the copying source to the copying destination on the basis of a result of the judgment by the servo internal status copying judgment unit 201; and the servo control unit 204 outputs each of the plurality of servo internal statuses 250 to each of the plurality of amplifiers 40 to control driving of the power source.

The foregoing slave unit 200 makes it possible to avoid delay of response time and performance degradation in driving the power source including the plurality of servo motors 50 and/or the servo motor 50A with the plurality of windings.

(2) The slave unit 200 may include the servo internal status monitoring unit 203 monitors the servo internal status 250 of the copying destination.

This makes it possible to detect abnormality occurring at any of the amplifiers 40, any of the servo motors 50, or any of the windings.

(3) The resource data 252 may include the number of the servo internal statuses 250 available for copying.

This makes it possible to determine a copying source easily.

(4) The copying destination may be changed according to change in the configuration of the plurality of amplifiers 40, the configuration of the plurality of servo motors 50, or the configuration of the plurality of windings.

This achieves flexible response to driving of the servo motor 50 or 50A.

(5) The servo internal status copying judgment unit 201 may determine the copying destination according to a running status of a machine as a driving target.

This achieves flexible response to driving of the servo motor 50 according to the running status of the machine (not shown).

(6) The servo internal statuses 250 corresponding to each of the plurality of the amplifiers 40 may be divided into a plurality of groups, the servo internal status copying judgment unit 201 may determine the copying source and the copying destination, and judge whether to copy the servo internal status of the copying source to the copying destination to commonalize between the copying source and the copying destination in each of the plurality of groups, and the servo internal status copying execution unit 202 may copy the servo internal status 250 of the copying source to the copying destination in each of the plurality of groups on the basis of a result of the judgment by the servo internal status copying judgment unit 201.

By doing so, even in driving a plurality of axes, delay of response time and performance degradation can still be avoided.

(7) The servo driving system 1 of this disclosure includes the high-order controller 100 and the slave unit 200 described in any one of (1) to (6).

The servo driving system 1 achieves effect comparable to the foregoing effect described in any one of (1) to (6).

EXPLANATION OF REFERENCE NUMERALS

1 Servo driving system
40(1) to 40(4) Amplifier
50(1) to 50(4) Servo motor
100 High-order controller
200 Slave unit
201 Servo internal status copying judgment unit
202 Servo internal status copying execution unit
203 Servo internal status monitoring unit
204 Servo control unit
250(1) to 250(4) Servo internal status
251 Judgment data
252 Resource data

What is claimed is:

1. A slave unit that drives a power source including a plurality of servo motors and/or a servo motor with a plurality of windings using a plurality of amplifiers on the basis of a command from a high-order controller, comprising:
 a storage unit stores servo internal statuses indicating the respective statuses of the plurality of servo motors and/or the respective statues of the plurality of windings, judgment data indicating the content of a set parameter, and resource data indicating at least the configuration of the plurality of amplifiers and the power source;
 a servo internal status copying judgment unit, on the basis of the judgment data and the resource data, the servo internal status copying judgment unit determines one servo internal status of the plurality of servo internal statuses to be a copying source, determines at least one remaining servo internal status to be a copying destination, and judges whether to copy the servo internal status of the copying source to the copying destination to commonalize between the copying source and the copying destination;
 a servo internal status copying execution unit copies the servo internal status of the copying source to the copying destination on the basis of a result of the judgment by the servo internal status copying judgment unit; and
 a servo control unit outputs each of the plurality of servo internal statuses to each of the plurality of amplifiers to control driving of the power source.

2. The slave unit according to claim 1, comprising a servo internal status monitoring unit monitors the servo internal status of the copying destination.

3. The slave unit according to claim 1, wherein the resource data includes the number of the servo internal statuses available for copying.

4. The slave unit according to claim 1, wherein the copying destination is changed according to change in the configuration of the plurality of amplifiers, the configuration of the plurality of servo motors, or the configuration of the plurality of windings.

5. The slave unit according to claim 1, wherein the servo internal status copying judgment unit determines the copying destination according to a running status of a machine as a driving target.

6. The slave unit according to claim 1, wherein the servo internal statuses corresponding to each of the plurality of amplifiers are divided into a plurality of groups,
- the servo internal status copying judgment unit determines the copying source and the copying destination, and judges whether to copy the servo internal status of the copying source to the copying destination to commonalize between the copying source and the copying destination in each of the plurality of groups, and
- the servo internal status copying execution unit copies the servo internal status of the copying source to the copying destination in each of the plurality of groups on the basis of a result of the judgment by the servo internal status copying judgment unit.

7. A servo driving system comprising a high-order controller and the slave unit according to claim 1.

\* \* \* \* \*